(12) United States Patent
Matsumoto et al.

(10) Patent No.: US 10,154,478 B2
(45) Date of Patent: Dec. 11, 2018

(54) MOBILE COMMUNICATION SYSTEM AND MOBILE COMMUNICATION METHOD

(71) Applicant: KYOCERA CORPORATION, Kyoto (JP)

(72) Inventors: Naohisa Matsumoto, Kawasaki (JP); Masato Fujishiro, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 128 days.

(21) Appl. No.: 15/280,181

(22) Filed: Sep. 29, 2016

(65) Prior Publication Data

US 2017/0019896 A1 Jan. 19, 2017

Related U.S. Application Data

(63) Continuation of application No. 14/385,831, filed as application No. PCT/JP2013/057360 on Mar. 15, 2013, now Pat. No. 9,544,878.

(Continued)

(51) Int. Cl.
*H04W 72/04* (2009.01)
*H04W 16/28* (2009.01)
(Continued)

(52) U.S. Cl.
CPC ........ *H04W 72/0413* (2013.01); *H04B 7/024* (2013.01); *H04W 16/28* (2013.01);
(Continued)

(58) Field of Classification Search
CPC ... H04W 72/02; H04W 84/042; H04W 28/16; H04W 72/1268; H04W 88/08;
(Continued)

(56) References Cited

U.S. PATENT DOCUMENTS 9,215,635 B2  12/2015  Sakamoto et al.
2011/0171955 A1*  7/2011  Acharya ............... H04W 72/02
                                                              455/434

(Continued)

FOREIGN PATENT DOCUMENTS

EP       2410669 A1     1/2012
JP    2005-269463 A     9/2005
(Continued)

OTHER PUBLICATIONS

International Search Report; PCT/JP2013/057360; dated May 28, 2013.

(Continued)

*Primary Examiner* — Jung Liu
*Assistant Examiner* — Adam Duda
(74) *Attorney, Agent, or Firm* — Studebaker & Brackett PC

(57) ABSTRACT

An anchor radio base station 310A comprises: an interface 315 A that notifies a non-anchor radio base station 310B of bit precision of an uplink signal before decoding, the uplink signal before decoding being to be transmitted through a backhaul network; and a control unit 316A that performs selective synthesis of the uplink signal before decoding received from the non-anchor radio base station 310B, and the uplink signal before decoding received from UE 10. The non-anchor radio base station 310B comprises: an interface 315B that transmits the uplink signal before decoding to the anchor radio base station 310A according to the bit precision notified by the anchor radio base station 310A.

3 Claims, 9 Drawing Sheets

Related U.S. Application Data

(60) Provisional application No. 61/612,585, filed on Mar. 19, 2012.

(51) Int. Cl.
*H04W 28/16* (2009.01)
*H04B 7/024* (2017.01)
*H04W 68/00* (2009.01)

(52) U.S. Cl.
CPC ......... *H04W 28/16* (2013.01); *H04W 68/005* (2013.01); *H04W 72/04* (2013.01)

(58) Field of Classification Search
CPC ... H04W 92/20; H04W 72/14; H04J 11/0053; H04B 7/024; H04B 7/0837; H04B 7/0404; H04L 1/00; H04L 1/1819
See application file for complete search history.

(56) References Cited

U.S. PATENT DOCUMENTS

| | | | | |
|---|---|---|---|---|
| 2012/0002611 A1* | 1/2012 | You | ......................... | H04B 7/024 370/328 |
| 2012/0099512 A1* | 4/2012 | Yamazaki | ............... | H04B 7/022 370/312 |
| 2012/0115539 A1* | 5/2012 | Zhang | ............... | H04W 56/0045 455/524 |
| 2012/0195284 A1* | 8/2012 | Mann | .................... | H04W 28/16 370/329 |
| 2012/0195484 A1* | 8/2012 | Ren | ....................... | G06T 3/0006 382/131 |
| 2012/0213109 A1* | 8/2012 | Xu | .......................... | H04B 7/024 370/252 |
| 2013/0017833 A1* | 1/2013 | Sakamoto | ............ | H04J 11/0053 455/436 |
| 2013/0088996 A1* | 4/2013 | Hara | ..................... | H04W 88/06 370/252 |
| 2013/0089159 A1* | 4/2013 | Liu | ........................ | H04B 7/024 375/267 |
| 2014/0321406 A1* | 10/2014 | Marinier | ................ | H04B 7/024 370/329 |

FOREIGN PATENT DOCUMENTS

| | | |
|---|---|---|
| WO | 2010/124726 A1 | 11/2010 |
| WO | 2010/150898 A1 | 12/2010 |
| WO | 2011/045658 A1 | 4/2011 |
| WO | 2011/152347 A1 | 12/2011 |
| WO | 2011/155257 A1 | 12/2011 |
| WO | 2011/158302 A1 | 12/2011 |

OTHER PUBLICATIONS

3GPP TR 36.819 V11.1.0 (Dec. 2011); 3rd Generation Partnership Project; Technical Specification Group Radio Access Network; Coordinated multi-point operation for LTE physical layer aspects (Release 11).

The extended European search report issued by the European Patent Office dated Nov. 2, 2015, which corresponds to European Patent Application No. 13764883.8-1857 and is related to U.S. Appl. No. 14/385,831.

Communication pursuant to Rules 70(2) and 70a(2) EPC issued by the European Patent Office dated Nov. 19, 2015, which corresponds to European Patent Application No. 13764883.8-1857 and is related to U.S. Appl. No. 14/385,831.

An Office Action; "Notice of Reasons for Rejection," issued by the Japanese Patent Office dated Dec. 15, 2015, which corresponds to Japanese Patent Application No. 2014-506187 and is related to U.S. Appl. No. 14/385,831; with English language statement of relevance.

An Office Action; "Decision of Refusal," issued by the Japanese Patent Office dated Apr. 12, 2016, which corresponds to Japanese Patent Application No. 2014-506187 and is related to U.S. Appl. No. 14/385,831; with English language statement of relevance.

An Office Action issued by the Japanese Patent Office dated Aug. 8, 2017, which corresponds to Japanese Patent Application No. 2014-506187 and is related to U.S. Appl. No. 15/280,181; with English language statement of relevance.

\* cited by examiner

FIG. 7

| SNR | BIT PRECISION |
|---|---|
| 20 | 4 |
| 10 | 8 |
| 0 | 16 |

FIG. 8

| MCS | BIT PRECISION |
|---|---|
| QPSK | 4 |
| 16QAM | 8 |
| 64QAM | 16 |

FIG. 9

| BLER | BIT PRECISION |
|---|---|
| 0.001 | 4 |
| 0.01 | 8 |
| 0.1 | 16 |

FIG. 10

| PREVIOUS TIME | BIT PRECISION |
|---|---|
| NG | UP |
| OK | KEEP OR DOWN |

MOBILE COMMUNICATION SYSTEM AND MOBILE COMMUNICATION METHOD

TECHNICAL FIELD

The present disclosure relates to a mobile communication system in which a plurality of radio base stations receive, in cooperation with one another, uplink signals transmitted from a radio terminal, and a mobile communication method used in the mobile communication system.

BACKGROUND ART

Conventionally, there has been known a mobile communication system in which a plurality of radio base stations receive, in cooperation with one another, uplink signals transmitted from a radio terminal. In such a mobile communication system, selective synthesis of the uplink signals received in the plurality of radio base stations is performed.

For example, in LTE (Long Term Evolution), the uplink signal is transmitted through PUSCH (Physical Uplink Shared Channel).

Here, the plurality of radio base stations include one anchor radio base station and remaining non-anchor radio base stations. The non-anchor radio base stations transmit uplink signals before decoding to the anchor radio base station through a backhaul network. The anchor radio base station performs selective synthesis of uplink signals before decoding, which are transmitted from the radio terminal, and uplink signals before decoding, which are received from the non-anchor radio base stations.

However, in such a case, since the uplink signals before decoding are transmitted from the non-anchor radio base stations to the anchor radio base station through the backhaul network, a load of the backhaul network is increased.

PRIOR ART DOCUMENT

Non-Patent Document

[Non-patent Document 1] 3GPP technology specifications "TR 36.819 V11.1.0" 22 Dec., 2011

SUMMARY

According to an embodiment, a first radio base station comprises: a receiver configured to receive, in cooperation with a second radio base station, uplink signals transmitted from a radio terminal, a notification unit configured to notify the second radio base station receiving an uplink signal having received quality which satisfies predetermined quality, of necessity to transmit the uplink signal before decoding through a backhaul network; and a controller configured to perform selective synthesis of the uplink signal before decoding received from the second radio base station, and the uplink signal before decoding received from the radio terminal after the notification unit notified the second radio base station of the necessity.

According to an embodiment, a first radio base station comprises: a receiver configured to receive uplink signals transmitted from a radio terminal, a transmitter configured to transmit an uplink signal before decoding, which is a subject of selective synthesis performed by a second base station, to the second radio base station through a backhaul network when received quality of the uplink signal received in the first radio base station satisfies predetermined quality.

According to an embodiment, a first radio base station comprises: a receiver configured to receive an uplink signal from a radio terminal, a controller configured to determine whether received quality of the uplink signal satisfies predetermined quality, and a transmitter configured to transmit the uplink signal to a second radio base station through a backhaul network when the received quality of the uplink signal satisfies the predetermined quality.

BRIEF DESCRIPTION OF THE DRAWINGS

FIG. 7 is a diagram for explaining the bit precision according to the first embodiment.

FIG. 8 is a diagram for explaining the bit precision according to the first embodiment.

FIG. 9 is a diagram for explaining the bit precision according to the first embodiment.

FIG. 10 is a diagram for explaining the bit precision according to the first embodiment.

MODES FOR CARRYING OUT THE DISCLOSURE

Figure 1:
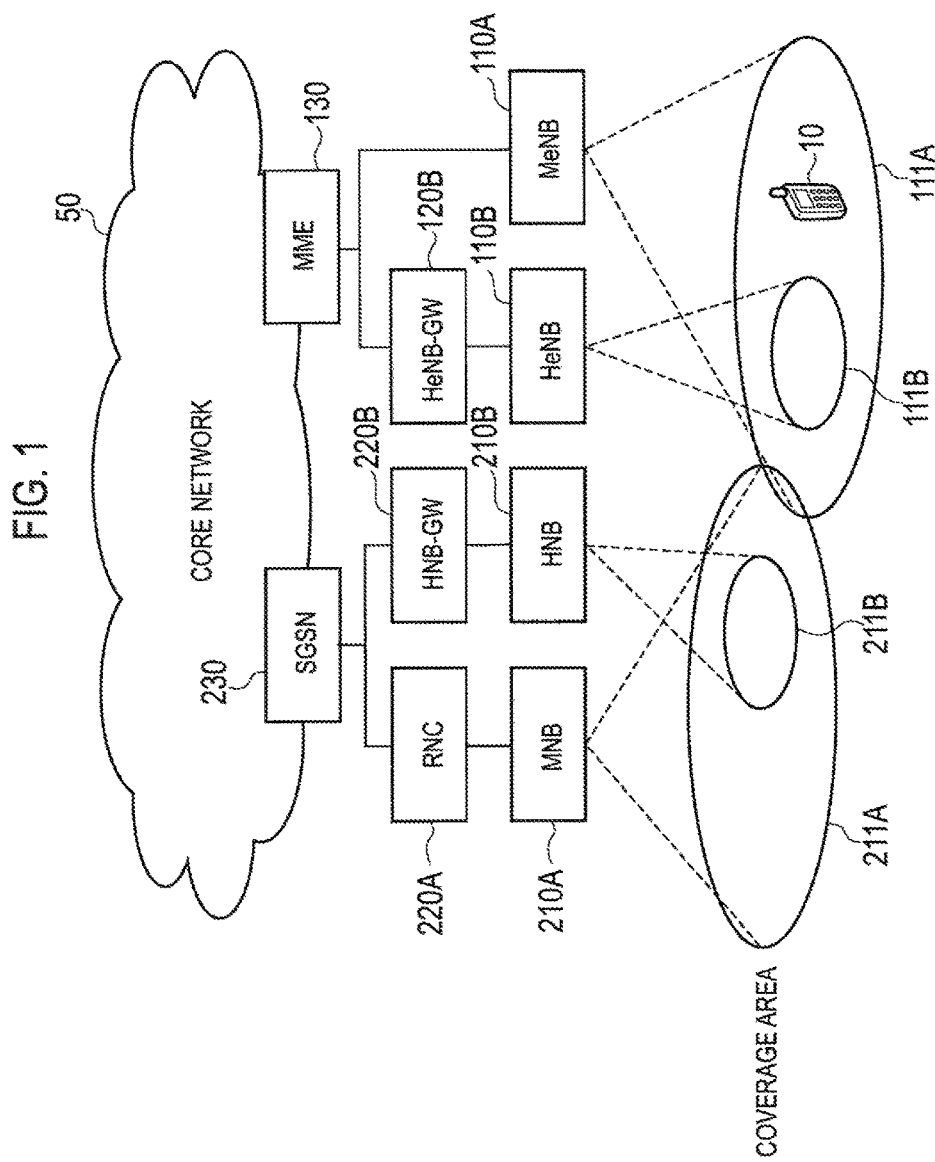
FIG. 1 is a diagram illustrating a mobile communication system 100 according to the first embodiment.

Hereinafter, a description will be given of the mobile communication system according to the embodiments of the present disclosure, with reference to the drawings. Note that the same or similar reference signs are applied to the same or similar portions in the drawings.

It will be appreciated that the drawings are schematically shown and the ratio and the like of each dimension are different from the real ones. Accordingly, specific dimensions should be determined in consideration of the explanation below. Of course, among the drawings, the dimensional relationship and the ratio may be different.

Summary of the First Embodiment

First, the mobile communication system according to the embodiment is a system, in which plurality of radio base stations receive, in cooperation with one another, uplink signals transmitted from a radio terminal. The plurality of radio base stations comprise: one anchor radio base station and a non-anchor radio base station other than the anchor radio base station. The anchor radio base station comprises: a notification unit that notifies the non-anchor radio base station of bit precision of an uplink signal before decoding, the uplink signal before decoding being to be transmitted through a backhaul network; and a control unit that performs selective synthesis of the uplink signal before decoding received from the non-anchor radio base station, and the uplink signal before decoding received from the radio terminal. The non-anchor radio base station comprises: a transmission unit that transmits the uplink signal before decoding to the anchor radio base station according to the bit precision notified by the anchor radio base station.

In the embodiment, the non-anchor radio base station transmits the uplink signal before decoding to the anchor radio base station according to the bit precision notified by the anchor radio base station. In other words, the uplink signal before decoding is transmitted with appropriate bit precision. Consequently, an increase in the load of the backhaul network is suppressed.

Second, the mobile communication system according to the embodiment is a system, in which a plurality of radio base stations receive, in cooperation with one another, uplink signals transmitted from a radio terminal. The plurality of radio base stations comprise one anchor radio base station and a non-anchor radio base station other than the anchor radio base station. The anchor radio base station comprises: a notification unit that notifies a non-anchor radio base station receiving an uplink signal, of which received quality satisfies predetermined quality, of necessity to transmit an uplink signal before decoding through a backhaul network; and a control unit that performs selective synthesis of the uplink signal before decoding received from the non-anchor radio base station, and the uplink signal before decoding received from the radio terminal. The non-anchor radio base station comprises: a transmission unit that transmits the uplink signal before decoding to the anchor radio base station when the necessity to transmit the uplink signal before decoding is notified by the anchor radio base station.

In the embodiment, the anchor radio base station notifies a non-anchor radio base station receiving an uplink signal, of which received quality satisfies predetermined quality, of necessity to transmit an uplink signal before decoding through a backhaul network. Consequently, unnecessary transmission of uplink signals before decoding to the anchor radio base station from a non-anchor radio base station is suppressed, resulting in the suppression of an increase in the load of the backhaul network.

Third, the mobile communication system according to a third feature is a system, in which a plurality of radio base stations receive, in cooperation with one another, uplink signals transmitted from a radio terminal. The plurality of radio base stations comprise one anchor radio base station and a non-anchor radio base station other than the anchor radio base station. The non-anchor radio base station comprises: a transmission unit that transmits an uplink signal before decoding to the anchor radio base station receiving the uplink signals having received quality which satisfies predetermined quality through a backhaul network. The anchor radio base station comprises: a control unit that performs selective synthesis of the uplink signal before decoding received from the non-anchor radio base station, and the uplink signal before decoding received from the radio terminal.

In the embodiment, the non-anchor radio base station transmits an uplink signal before decoding to the anchor radio base station through a backhaul network when received quality of the uplink signal received in the non-anchor radio base station satisfies predetermined quality. Consequently, unnecessary transmission of uplink signals before decoding to the anchor radio base station from a non-anchor radio base station is suppressed, resulting in the suppression of an increase in the load of the backhaul network.

First Embodiment

Mobile Communication System

Hereinafter, a mobile communication system according to a first embodiment will be described. FIG. 1 is a diagram illustrating a mobile communication system 100 according to the first embodiment.

As illustrated in FIG. 1, the mobile communication system 100 includes a radio terminal 10 (hereinafter, referred to as UE 10) and a core network 50. Furthermore, the mobile communication system 100 includes a first communication system and a second communication system.

The first communication system, for example, is a communication system corresponding to LTE (Long Term Evolution). The first communication system, for example, includes a base station 110A (hereinafter, referred to as MeNB 110A), a home base station 110B (hereinafter, referred to as HeNB 110B), a home base station gateway 120B (hereinafter, referred to as HeNB-GW 120B), and MME 130.

In addition, a radio access network (E-UTRAN; Evolved Universal Terrestrial Radio Access Network) corresponding to the first communication system is configured by the MeNB 110A, the HeNB 110B, and the HeNB-GW 120B.

The second communication system, for example, is a communication system corresponding to UMTS (Universal Mobile Telecommunication System). The second communication system, includes a base station 210A (hereinafter, referred to as MNB 210A), a home base station 210B (hereinafter, referred to as HNB 210B), RNC 220A, a home base station gateway 220B (hereinafter, referred to as HNB-GW 220B), and SGSN 230.

In addition, a radio access network (UTRAN; Universal Terrestrial Radio Access Network) corresponding to the second communication system is configured by the MNB 210A, the HNB 210B, the RNC 220A, and the HNB-GW 220B.

The UE 10 is a device (User Equipment) configured to communicate with the second communication system or the first communication system. For example, the UE 10 has a function of performing radio communication with the MeNB 110A and the HeNB 110B. Alternatively, the UE 10 has a function of performing radio communication with the MNB 210A and the HNB 210B.

The MeNB 110A, which manages a general cell 111A, is a device (evolved NodeB) that performs radio communication with the UE 10 being present in the general cell 111A.

The HeNB 110B, which manages a specific cell 111B, is a device (Home evolved NodeB) that performs radio communication with the UE 10 being present in the specific cell 111B.

The HeNB-GW 120B, which is connected to the HeNB 110B, is a device (Home evolved NodeB Gateway) that manages the HeNB 110B.

The MME 130, which is connected to the MeNB 110A, is a device (Mobility Management Entity) that manages the mobility of the UE 10 having set up of a radio connection with the MeNB 110A. Furthermore, the MME 130, which is connected to the HeNB 110B via the HeNB-GW 120B, is a device that manages the mobility of the UE 10 having set up of a radio connection with the HeNB 110B.

The MNB 210A, which manages a general cell 211A, is a device (NodeB) that performs radio communication with the UE 10 being present in the general cell 211A.

The HNB 210B, which manages a specific cell 211B, is a device (Home NodeB) that performs radio communication with the UE 10 being present in the specific cell 211B.

The RNC 220A, which is connected to the MNB 210A, is a device (Radio Network Controller) that sets up a radio connection (RRC connection) with the UE 10 being present in the general cell 211A.

The HNB-GW 220B, which is connected to the HNB 210B, is a device (Home NodeB Gateway) that sets up a radio connection (RRC Connection) with the UE 10 being present in the specific cell 211B.

The SGSN 230 is a device (Serving GPRS Support Node) that performs packet switching in a packet switching domain. The SGSN 230 is provided in the core network 50. Although not illustrated in FIG. 1, a device (MSC; Mobile Switching Center) that performs circuit switching in a circuit switching domain may be provided in the core network 50.

In addition, it is noted that the general cell and the specific cell are understood as a function of performing radio communication with the UE 10. However, the general cell and the specific cell are also used as a term indicating a coverage area of a cell. Furthermore, cells such as general cells and specific cells are identified by frequencies, spreading codes, time slots and the like used in the cells.

Here, a coverage area of the general cell is wider than a coverage area of the specific cell. The general cell, for example, is a macro cell provided by a communication provider. The specific cell, for example, is a femto cell or a home cell provided by the third party other than the communication provider. The specific cell may be a CSG (Closed Subscriber Group) cell or a pico cell provided by the communication provider.

Hereinafter, the first communication system will be mainly described. The following description may also be applied to the second communication system.

In the first communication system, an OFDMA (Orthogonal Frequency Division Multiple Access) scheme is used as a downlink multiplexing scheme, and an SC-FDMA (Single-Carrier Frequency Division Multiple Access) scheme is used as an uplink multiplexing scheme.

Furthermore, in the first communication system, as an uplink channel, an uplink control channel (PUCCH; Physical Uplink Control Channel), an uplink shared channel (PUSCH; Physical Uplink Shared Channel) and the like exist. Furthermore, as a downlink channel, a downlink control channel (PDCCH; Physical Downlink Control Channel), a downlink shared channel (PDSCH; Physical Downlink Shared Channel) and the like exist.

The uplink control channel is a channel that carries a control signal. The control signal, for example, includes CQI (Channel Quality Indicator), PMI (Precoding Matrix Indicator), RI (Rank Indicator), SR (Scheduling Request), and ACK/NACK.

The CQI is a signal that notifies a recommended modulation scheme and an encoding rate to be used in downlink transmission. The PMI is a signal that indicates a precoder matrix preferably used for the downlink transmission. The RI is a signal that indicates the number of layers (the number of streams) to be used in the downlink transmission. The SR is a signal that requests the assignment of an uplink radio resource (a resource block which will be described later). The ACK/NACK is a signal that indicates whether it is possible to receive a signal that is transmitted through a downlink channel (for example, PDSCH).

The uplink shared channel is a channel that carries a control signal (including the aforementioned control signal) and/or a data signal. For example, the uplink radio resource may be assigned only to the data signal, or may be assigned such that the data signal and the control signal are multiplexed.

The downlink control channel is a channel that carries a control signal. The control signal, for example, includes Uplink SI (Scheduling Information), Downlink SI (Scheduling Information), and a TPC bit.

The Uplink SI is a signal that indicates the assignment of the uplink radio resource. The Downlink SI is a signal that indicates the assignment of a downlink radio resource. The TPC bit is a signal that indicates increase and decrease in power of a signal that is transmitted through the uplink channel.

The downlink shared channel is a channel that carries a control signal and/or a data signal. For example, the downlink radio resource may be assigned only to the data signal, or may be assigned such that the data signal and the control signal are multiplexed.

In addition, a control signal transmitted through the downlink shared channel includes TA (Timing Advance). The TA is transmission timing correction information between the UE 10 and the MeNB 110A, and is measured by the MeNB 110A on the basis of an uplink signal transmitted from the UE 10.

Furthermore, a control signal that is transmitted through a channel other than the downlink control channel (PDCCH) and the downlink shared channel (PDSCH) includes the ACK/NACK. The ACK/NACK is a signal that indicates whether it is possible to receive a signal that is transmitted through an uplink channel (for example, PUSCH).

In addition, the general cell and the specific cell broadcast broadcast information through a broadcast channel (BCCH; Broadcast Control Channel). The broadcast information, for example, is information such as MIB (Master Information Block) or SIB (System Information Block).

(Radio Frame)

Figure 2:
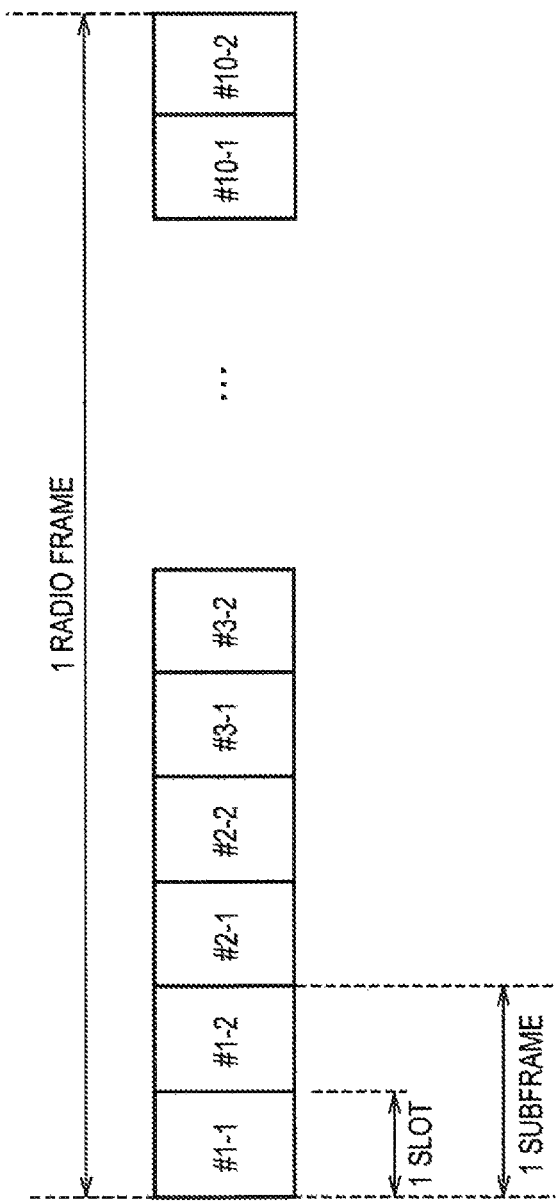
FIG. 2 is a diagram illustrating the radio frame in the first communication system.

Hereinafter, a radio frame in the first communication system will be described. FIG. 2 is a diagram illustrating the radio frame in the first communication system.

As illustrated in FIG. 2, one radio frame is configured by 10 subframes and one subframe is configured by two slots. One slot has a time length of 0.5 msec, one subframe has a time length of 1 msec, and one radio frame has a time length of 10 msec.

In addition, one slot is configured by a plurality of OFDM symbols (for example, six OFDM symbols or seven OFDM symbols) in a downlink. Similarly, one slot is configured by a plurality of SC-FDMA symbols (for example, six SC-FDMA symbols or seven SC-FDMA symbols) in an uplink.

(Radio Resource)

Figure 3:
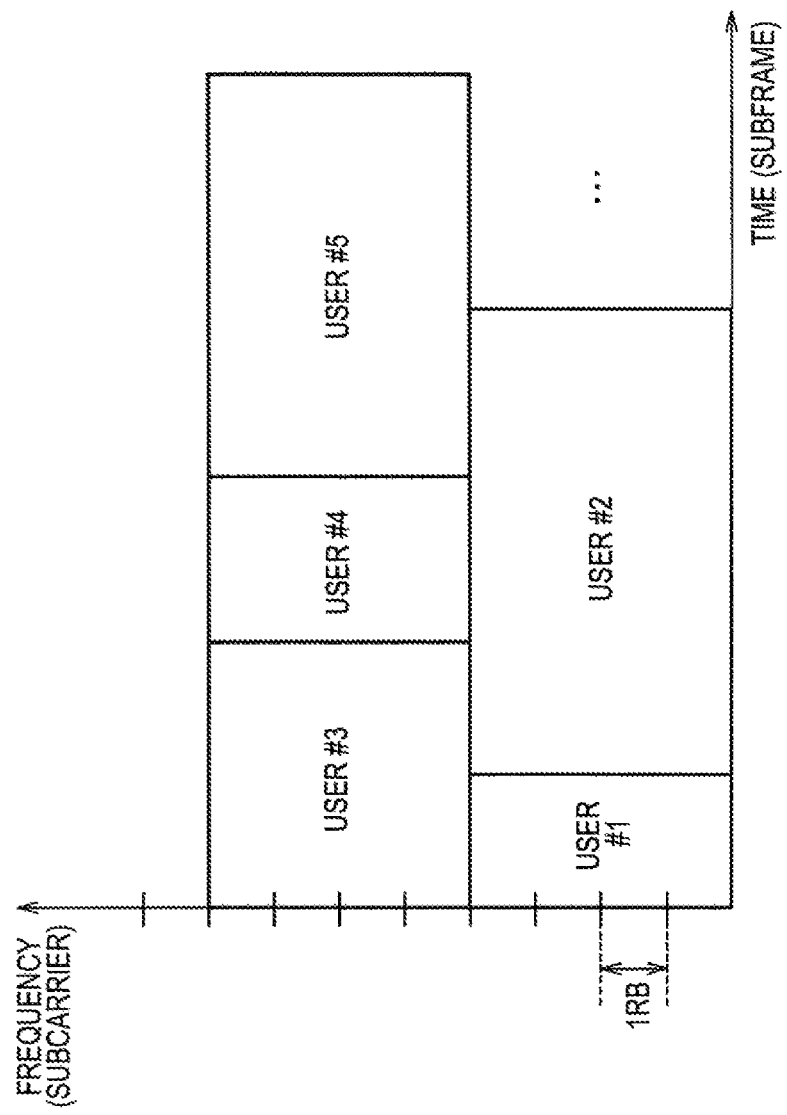
FIG. 3 is a diagram illustrating the radio resource in the first communication system.

Hereinafter, a radio resource in the first communication system will be described. FIG. 3 is a diagram illustrating the radio resource in the first communication system.

As illustrated in FIG. 3, a radio resource is defined by a frequency axis and a time axis. A frequency is configured by a plurality of subcarriers, and a predetermined number of subcarriers (12 subcarriers) are collectively called a resource block (RB). A time has a unit, such as the OFDM symbol (or the SC-FDMA symbol), the slot, the subframe, or the radio frame, as described above.

Here, the radio resource is assignable to each one resource block. Furthermore, on the frequency axis and the time axis, it is possible to divide the radio resources to assign the same to a plurality of users (for example, user #1 to user #5).

Furthermore, the radio resource is assigned by the MeNB 110A. The MeNB 110A assigns the radio resources to each UE 10 on the basis of the CQI, the PMI, the RI and the like.

(Application Scene)

Figure 4:
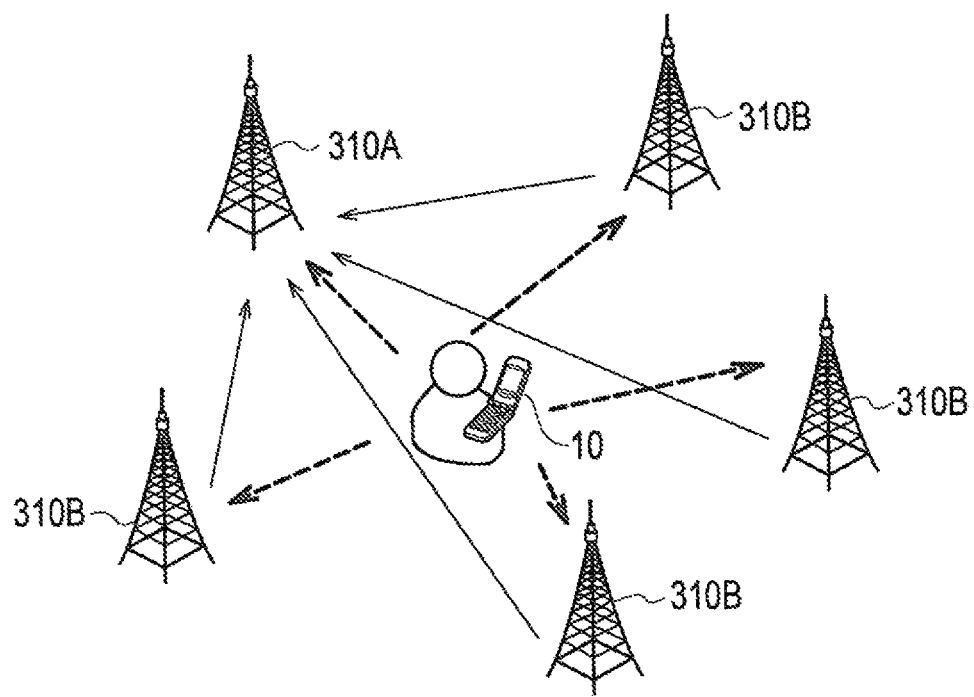
FIG. 4 is a diagram for explaining the application scene according to the first embodiment.

Hereinafter, an application scene according to the first embodiment will be described. FIG. 4 is a diagram for explaining the application scene according to the first embodiment. FIG. 4 illustrates a case in which one anchor radio base station 310A and a plurality of non-anchor radio base stations 310B are provided as radio base stations. The anchor radio base station 310A and the non-anchor radio base stations 310B constitute a radio base station group (a CoMP set) that receives uplink signals transmitted from the UE 10 in cooperation with each other.

As illustrated in FIG. 4, the UE 10 transmits the uplink signals to the anchor radio base station 310A and the non-anchor radio base stations 310B. It is noted that the uplink signals transmitted from the UE 10 are coded. For example, the uplink signals transmitted from the UE 10, for example, are transmitted through the aforementioned uplink shared channel (PUSCH).

Here, the non-anchor radio base stations 310B transmit uplink signals before decoding to the anchor radio base station 310A through a backhaul network. The anchor radio base station 310A performs selective synthesis of uplink signals before decoding, which are transmitted from the UE 10, and uplink signals before decoding, which are received from the non-anchor radio base stations 310B.

The backhaul network may be an X2 interface for directly connecting radio base stations to each other, or an S1 interface for connecting the radio base stations to each other through an upper node (for example, the MME 130).

It is sufficient if the anchor radio base station 310A and the non-anchor radio base stations 310B are radio base stations. That is, in the first embodiment, the anchor radio base station 310A and the non-anchor radio base stations 310B are one of the MeNB 110A, the HeNB 110B, the MNB 210A, and the HNB 210B.

In such a case, in the first embodiment, the anchor radio base station 310A notifies the non-anchor radio base stations 310B of bit precision of an uplink signal before decoding, which is to be transmitted through the backhaul network. The non-anchor radio base stations 310B transmit uplink signals before decoding to the anchor radio base station 310A according to the bit precision notified by the anchor radio base station 310A.

Here, the bit precision indicates granularity (hereinafter, referred to as sampling granularity) by which the uplink signal before decoding is sampled. In other words, the bit precision is the number of bits (resolution) indicating I/Q components constituting the uplink signal before decoding. The bit precision may be expressed by an index indicating the sampling granularity.

The bit precision, for example, is a value for directly designating the precision of the uplink signal before decoding. That is, the bit precision is an absolute value indicating the sampling granularity.

In such a case, the bit precision is determined on the basis of at least one of received quality of an uplink signal before decoding, received quality of an uplink signal after decoding, and a modulation and coding scheme of an uplink signal.

The received quality of the uplink signal before decoding is radio quality before decoding, and for example, is SNR (Signal-to-Noise Ratio), SINR (Signal-to-Interference Noise Ratio) and the like. The received quality of the uplink signal after decoding is quality after decoding, and for example, is BLER (Block Error Rate) and the like. The modulation and coding scheme of the uplink signal is a value having an influence on a transmission speed and an error rate of data, and is called MCS (Modulation and Coding Scheme).

Alternatively, the bit precision, for example, is a value for relatively designating the precision of the uplink signal before decoding. That is, the bit precision is a relative value indicating the sampling granularity.

In such a case, the bit precision is a value (hereinafter, referred to as UP) indicating an increase in the sampling granularity, a value (hereinafter, referred to as KEEP) indicating the maintenance of the sampling granularity, or a value (hereinafter, referred to as DOWN) indicating a decrease in the sampling granularity. As the bit precision, for example, UP is selected in case of failure in decoding an uplink signal of a previous time, and KEEP or DOWN is selected in case of success in decoding the uplink signal of the previous time.

(Anchor Radio Base Station)

Figure 5:
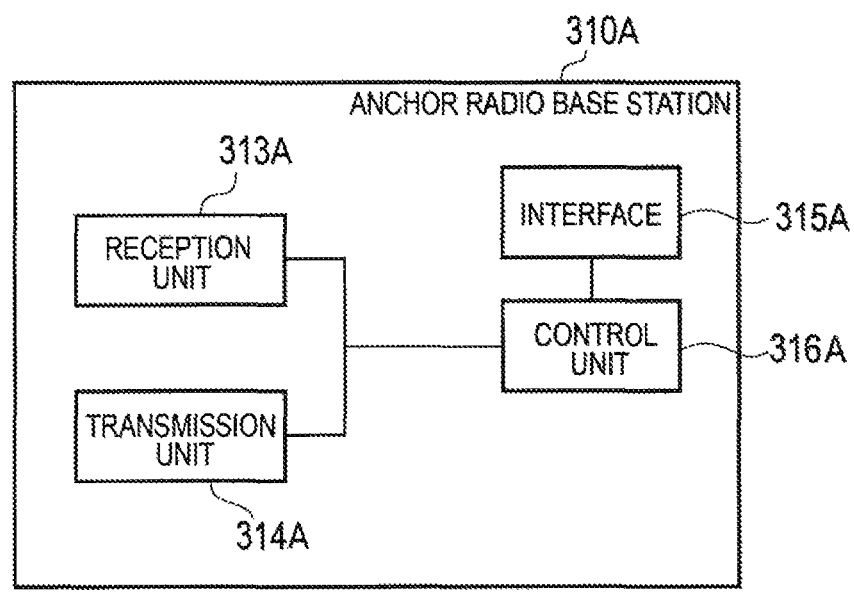
FIG. 5 is a block diagram illustrating the anchor radio base station 310A according to the first embodiment.

Hereinafter, an anchor radio base station according to the first embodiment will be described. FIG. 5 is a block diagram illustrating the anchor radio base station 310A according to the first embodiment.

As illustrated in FIG. 5, the anchor radio base station 310A includes a reception unit 313A, a transmission unit 314A, an interface 315A, and a control unit 316A.

The reception unit 313A receives an uplink signal from the UE 10 connected to a cell managed by the anchor radio base station 310A. The reception unit 313A, for example, receives the uplink signal through the uplink shared channel (PUSCH).

The transmission unit 314A transmits a downlink signal to the UE 10 connected to the cell managed by the anchor radio base station 310A. The transmission unit 314A, for example, transmits a radio resource (scheduling information) assigned by the anchor radio base station 310A.

The interface 315A is an interface used for performing communication with another radio base station through the backhaul network. The interface 315A is an X2 interface for directly connecting radio base stations to each other. Alternatively, the interface 315A is an S1 interface for connecting the radio base stations to each other through an upper node (for example, the MME 130).

In the first embodiment, the interface 315A constitutes a notification unit configured to notify the non-anchor radio base stations 310B of bit precision of an uplink signal before decoding, which is to be transmitted through the backhaul network.

The control unit 316A is configured to control the operation of the anchor radio base station 310A. The control unit 316A, for example, performs selective synthesis of uplink signals before decoding, which are transmitted from the UE 10, and uplink signals before decoding, which are received from the non-anchor radio base stations 310B. Specifically, the control unit 316A may select an uplink signal before decoding, which has the best received quality among the uplink signals before decoding, which are transmitted from the UE 10 and the uplink signals before decoding, which are received from the non-anchor radio base stations 310B, and may decode the selected uplink signal before decoding. Alternatively, the control unit 316A may synthesize uplink signals before decoding, which have predetermined quality or more among the uplink signals before decoding, which are transmitted from the UE 10 and the uplink signals before decoding, which are received from the non-anchor radio base stations 310B, and may decode the synthesized uplink signal before decoding. In addition, the control unit 316A may synthesize all of the uplink signals before decoding, which are transmitted from the UE 10 and the uplink signals before decoding, which are received from the non-anchor radio base stations 310B, and may decode the synthesized uplink signal before decoding.

(Non-Anchor Radio Base Station)

Figure 6:
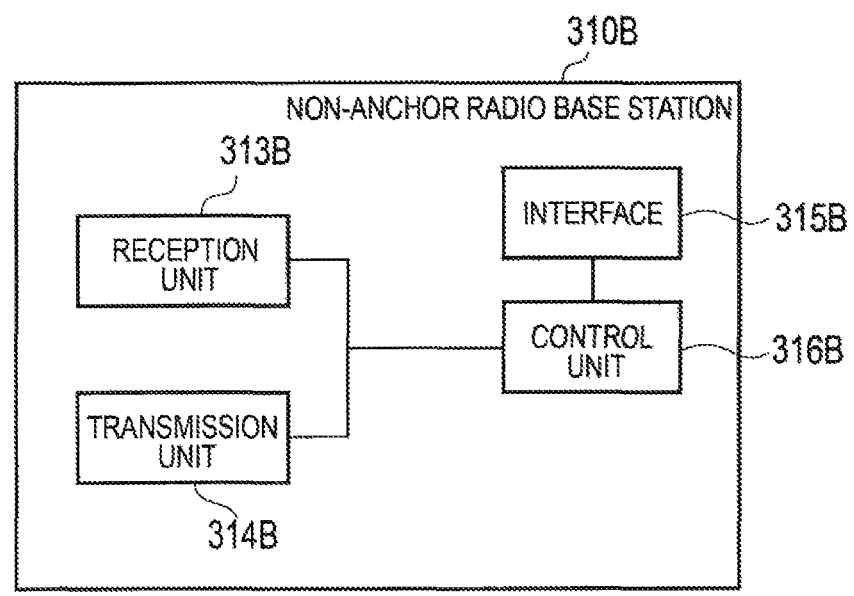
FIG. 6 is a block diagram illustrating the non-anchor radio base station 310B according to the first embodiment.

Hereinafter, a non-anchor radio base station according to the first embodiment will be described. FIG. 6 is a block diagram illustrating the non-anchor radio base station 310B according to the first embodiment.

As illustrated in FIG. 6, the non-anchor radio base station 310B includes a reception unit 313B, a transmission unit 314B, an interface 315B, and a control unit 316B.

The reception unit 313B receives an uplink signal from the UE 10 connected to a cell managed by the non-anchor radio base station 310B. The reception unit 313B, for example, receives the uplink signal through the uplink shared channel (PUSCH).

The transmission unit 314B transmits a downlink signal to the UE 10 connected to the cell managed by the non-anchor radio base station 310B. The transmission unit 314B, for example, transmits a radio resource (scheduling information) assigned by the non-anchor radio base station 310B.

The interface 315B is an interface used for performing communication with another radio base station through the backhaul network. The interface 315B is an X2 interface for directly connecting radio base stations to each other. Alternatively, the interface 315B is an S1 interface for connecting the radio base stations to each other through an upper node (for example, the MME 130).

In the first embodiment, the interface 315B constitutes a transmission unit that transmits an uplink signal before decoding to the anchor radio base station 310A through the backhaul network according to the bit precision notified by the anchor radio base station 310A.

The control unit 316B is configured to control the operation of the non-anchor radio base station 310B. For example, the control unit 316B instructs the interface 315B to transmit the uplink signal before decoding.

(Bit Precision)

Hereinafter, bit precision according to the first embodiment will be described. FIG. 7 to FIG. 10 are diagrams for explaining the bit precision according to the first embodiment. The bit precision is a value indicating sampling granularity. Here, the bit precision is expressed in the form of an index. Here, it is noted that the larger the value of the bit precision is, the finer the sampling granularity is.

For example, as illustrated in FIG. 7, the bit precision is an absolute value and is determined on the basis of SNR. For example, when SNR is equal to or more than "20", "4" is selected as the bit precision. When SNR is equal to or more than "10" and smaller than "20", "8" is selected as the bit precision. When SNR is equal to or more than "0" and smaller than "10", "16" is selected as the bit precision. In this way, the lower the SNR is, the finer the sampling granularity of the bit precision is selected.

Alternatively, as illustrated in FIG. 8, the bit precision is an absolute value and is determined on the basis of MCS. For example, when MCS is QPSK, "4" is selected as the bit precision. When MCS is 16QAM, "8" is selected as the bit precision. When MCS is 64QAM, "16" is selected as the bit precision. In this way, the higher a transmission speed is, the finer the sampling granularity of the bit precision is selected.

Alternatively, as illustrated in FIG. 9, the bit precision is an absolute value and is determined based on BLER. For example, when BLER is equal to or more than "0.001" and smaller than "0.01", "4" is selected as the bit precision. When BLER is equal to or more than "0.01" and smaller than "0.1", "8" is selected as the bit precision. When BLER is equal to or more than "0.1", "16" is selected as the bit precision. In this way, the higher the BLER is, the finer the sampling granularity of the bit precision is selected.

Alternatively, as illustrated in FIG. 10, the bit precision is a relative value and is determined on the basis of a decoding result of a previous time. For example, when the decoding result of a previous time is NG, that is, in case of failure in decoding an uplink signal of a previous time, UP is selected as the bit precision. Meanwhile, when the decoding result of a previous time is OK, that is, in case of success in decoding the uplink signal of a previous time, KEEP or DOWN is selected as the bit precision.

(Operation of Mobile Communication System)

Figure 11:
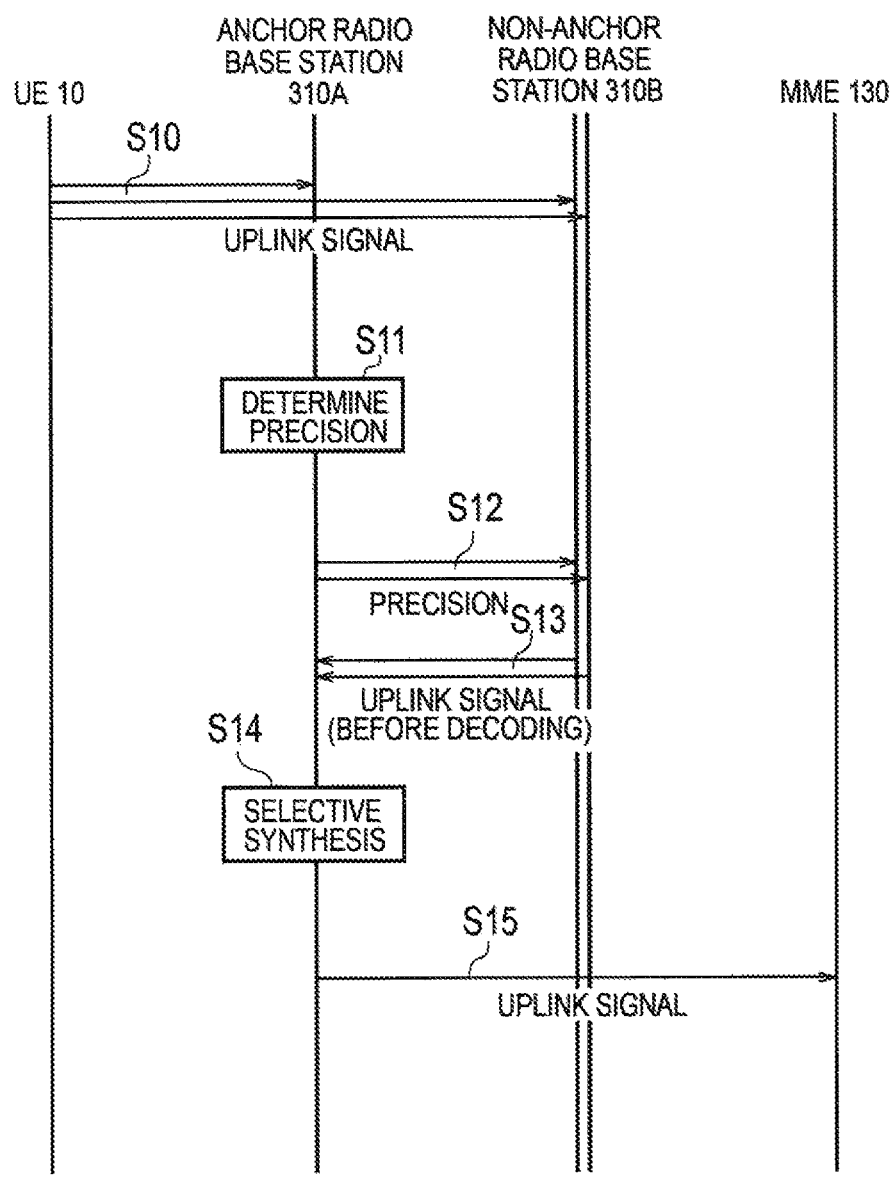
FIG. 11 is a sequence diagram illustrating the operation of the mobile communication system 100 according to the first embodiment.

Hereinafter, the operation of the mobile communication system according to the first embodiment will be described. FIG. 11 is a sequence diagram illustrating the operation of the mobile communication system 100 according to the first embodiment.

As illustrated in FIG. 11, in step 10, the UE 10 transmits uplink signals to the anchor radio base station 310A and the non-anchor radio base stations 310B.

In step 11, the anchor radio base station 310A determines bit precision of uplink signals before decoding, which are to be transmitted through the backhaul network.

In step 12, the anchor radio base station 310A notifies the non-anchor radio base stations 310B of the bit precision of the uplink signals before decoding, which are to be transmitted through the backhaul network.

In step 13, the non-anchor radio base stations 310B transmit the uplink signals before decoding to the anchor radio base station 310A according to the bit precision notified by the anchor radio base station 310A.

In step 14, the anchor radio base station 310A performs selective synthesis of the uplink signals before decoding, which are transmitted from the UE 10, and the uplink signals before decoding, which are received from the non-anchor radio base stations 310B.

In step 15, the anchor radio base station 310A transmits a decoding result of the uplink signals to the MME 130.

Here, since the case, in which the anchor radio base station 310A is the MeNB 110A or the HeNB 110B, is exemplified, the decoding result of the uplink signals is transmitted to the MME 130. However, the embodiment is not limited thereto. In the case in which the anchor radio base station 310A is the MNB 210A or the HNB 210B, the decoding result of the uplink signals is transmitted to the RNC 220A.

(Operation and Effect)

In the first embodiment, the non-anchor radio base stations 310B transmit the uplink signals before decoding to the anchor radio base station 310A according to the bit precision notified by the anchor radio base station 310A. In other words, the uplink signals before decoding are transmitted with appropriate bit precision. Consequently, an increase in the load of the backhaul network is suppressed.

[First Modification]

Hereinafter, a first modification of the first embodiment is explained. Mainly the differences from the first embodiment are described, below.

In the first embodiment, the anchor radio base station 310A (the interface 315A) notifies the non-anchor radio base stations 310B of the bit precision of the uplink signals before decoding, which are to be transmitted through the backhaul network. The non-anchor radio base stations 310B (the interface 315B) transmit the uplink signals before decoding to the anchor radio base station 310A according to the bit precision notified by the anchor radio base station 310A.

On the other hand, in the first modification, the anchor radio base station 310A (the interface 315A) notifies a non-anchor radio base station among the non-anchor radio base stations 310B of necessity to transmit the uplink signal before decoding through the backhaul network, wherein the non-anchor radio base station receives an uplink signal having received quality (for example, SNR or SINR) that satisfies predetermined quality. When the necessity to transmit the uplink signal before decoding was notified by the anchor radio base station 310A, the non-anchor radio base station 310B (the interface 315B) transmits the uplink signal before decoding to the anchor radio base station 310A.

In other words, in the first modification, when the necessity to transmit the uplink signal before decoding was not notified by the anchor radio base station 310A, the non-anchor radio base station 310B (the interface 315B) does not transmit the uplink signal before decoding to the anchor radio base station 310A.

(Operation of Mobile Communication System)

Figure 12:
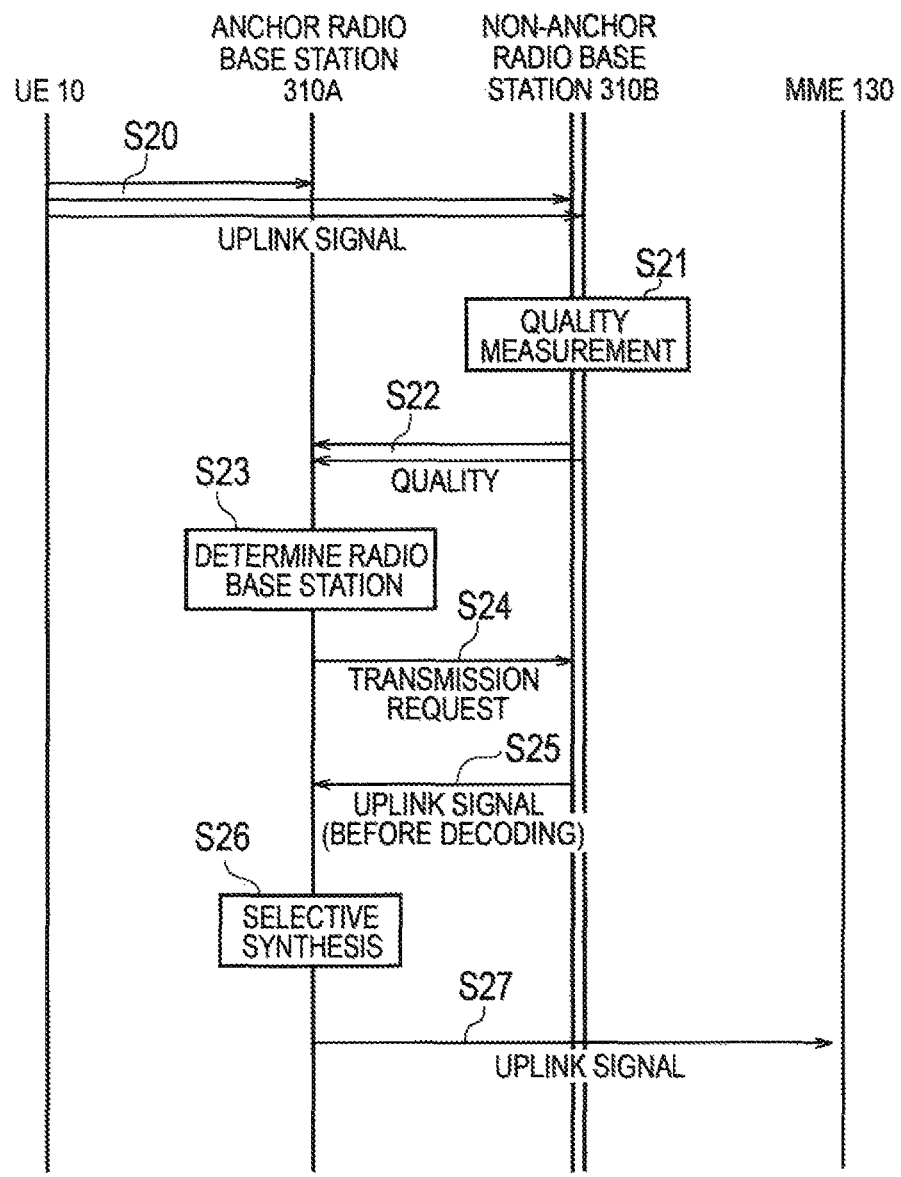
FIG. 12 is a sequence diagram illustrating the operation of the mobile communication system 100 according to the first modification.

Hereinafter, the operation of a mobile communication system according to the first modification will be described. FIG. 12 is a sequence diagram illustrating the operation of the mobile communication system 100 according to the first modification.

As illustrated in FIG. 12, in step 20, the UE 10 transmits uplink signals to the anchor radio base station 310A and the non-anchor radio base stations 310B.

In step 21, each non-anchor radio base station 310B measures received quality of the uplink signal.

In step 22, each non-anchor radio base station 310B notifies the anchor radio base station 310A of the received quality of the uplink signal.

In step 23, the anchor radio base station 310A determines the non-anchor radio base station 310B that should transmit an uplink signal before decoding through the backhaul network. Specifically, the anchor radio base station 310A determines a non-anchor radio base station, in which the received quality notified in step 22 satisfies predetermined quality, as the non-anchor radio base station 310B that should transmit the uplink signal before decoding.

In step 24, the anchor radio base station 310A notifies the non-anchor radio base station 310B among the non-anchor radio base stations 310B of necessity to transmit the uplink signal before decoding through the backhaul network, wherein the non-anchor radio base station 310B receives an uplink signal having received quality (for example, SNR or SINR) that satisfies predetermined quality.

In step 25, the non-anchor radio base station 310B, which was notified of the necessity to transmit the uplink signal before decoding by the anchor radio base station 310A, transmits the uplink signal before decoding to the anchor radio base station 310A.

In step 26, the anchor radio base station 310A performs selective synthesis of the uplink signals before decoding, which are transmitted from the UE 10, and the uplink signals before decoding, which are received from the non-anchor radio base stations 310B in which the received quality satisfies the predetermined quality.

In step 27, the anchor radio base station 310A transmits a decoding result of the uplink signals to the MME 130.

Here, since the case, in which the anchor radio base station 310A is the MeNB 110A or the HeNB 110B, is exemplified, the decoding result of the uplink signals is transmitted to the MME 130. However, the embodiment is not limited thereto. In the case in which the anchor radio base station 310A is the MNB 210A or the HNB 210B, the decoding result of the uplink signals is transmitted to the RNC 220A.

(Operation and Effect)

In the first modification, the anchor radio base station 310A notifies the non-anchor radio base station 310B among the non-anchor radio base stations 310B of necessity to transmit the uplink signal before decoding through the backhaul network, wherein the non-anchor radio base station 310B receives an uplink signal having received quality that satisfies predetermined quality. Consequently, unnecessary transmission of uplink signals before decoding to the anchor radio base station 310A from a non-anchor radio base station 310B is suppressed, resulting in the suppression of an increase in the load of the backhaul network.

[Second Modification]

A description will be given below of a second modification of the first embodiment. Mainly the differences from the first embodiment are described, below.

In the first embodiment, the anchor radio base station 310A (the interface 315A) notifies the non-anchor radio base station 310B of the bit precision of the uplink signal before decoding, which is to be transmitted through the backhaul network. The non-anchor radio base station 310B (the interface 315B) transmits the uplink signal before decoding to the anchor radio base station 310A according to the bit precision notified by the anchor radio base station 310A.

On the other hand, in the second modification, when received quality of uplink signals received in the non-anchor radio base stations 310B satisfies predetermined quality, the non-anchor radio base station 310B (the interface 315B) transmits the uplink signal before decoding to the anchor radio base station 310A through the backhaul network.

In other words, in the second modification, when the received quality of the uplink signals received in the non-anchor radio base stations 310B does not satisfy the predetermined quality, the non-anchor radio base station 310B (the interface 315B) does not transmit the uplink signal before decoding to the anchor radio base station 310A.

Here, the predetermined quality may be notified, by the anchor radio base station 310A (the interface 315A), to the non-anchor radio base station 310B before the uplink signal is received from the UE 10. Alternatively, the predetermined quality may be determined in advance.

(Operation of Mobile Communication System)

Figure 13:
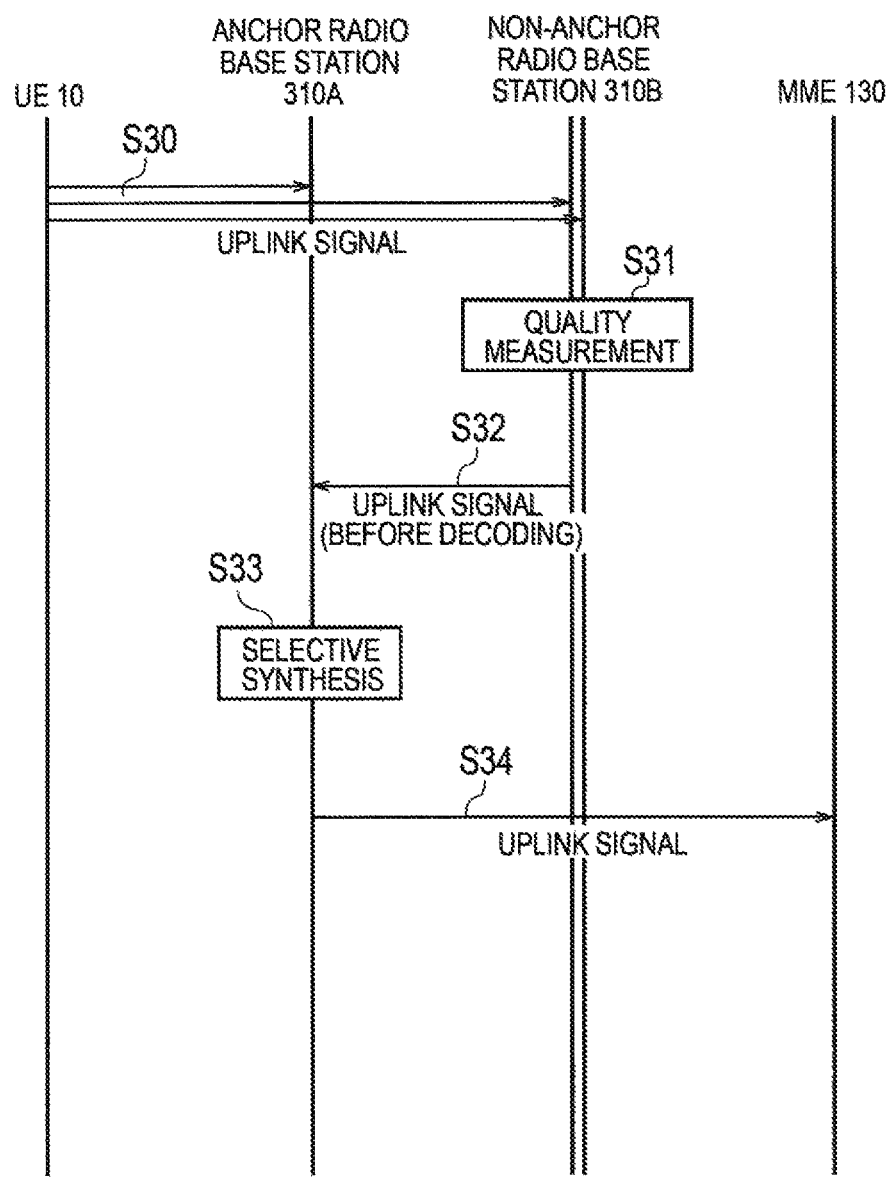
FIG. 13 is a sequence diagram illustrating the operation of the mobile communication system 100 according to the second modification.

Hereinafter, the operation of a mobile communication system according to the second modification will be described. FIG. 13 is a sequence diagram illustrating the operation of the mobile communication system 100 according to the second modification.

As illustrated in FIG. 13, in step 30, the UE 10 transmits uplink signals to the anchor radio base station 310A and the non-anchor radio base stations 310B.

In step 31, each non-anchor radio base station 310B (for example, the control unit 316B) measures received quality of the uplink signal.

In step 32, among the non-anchor radio base stations 310B, the non-anchor radio base station 310B, which receives an uplink signal having received quality (for example, SNR or SINR) that satisfies predetermined quality, transmits uplink signals before decoding to the anchor radio base station 310A through the backhaul network.

In step 33, the anchor radio base station 310A performs selective synthesis of the uplink signals before decoding, which are transmitted from the UE 10, and the uplink signals before decoding, which are received from the non-anchor radio base stations 310B in which the received quality satisfies the predetermined quality.

In step 34, the anchor radio base station 310A transmits a decoding result of the uplink signals to the MME 130.

Here, since the case, in which the anchor radio base station 310A is the MeNB 110A or the HeNB 110B, is exemplified, the decoding result of the uplink signals is transmitted to the MME 130. However, the embodiment is not limited thereto. In the case in which the anchor radio base station 310A is the MNB 210A or the HNB 210B, the decoding result of the uplink signals is transmitted to the RNC 220A.

(Operation and Effect)

In the second modification, when the received quality of the uplink signals received in the non-anchor radio base stations 310B satisfies the predetermined quality, the non-anchor radio base stations 310B transmit the uplink signals before decoding to the anchor radio base station 310A through the backhaul network. Consequently, unnecessary transmission of uplink signals before decoding to the anchor radio base station 310A from a non-anchor radio base station 310B is suppressed, resulting in the suppression of an increase in the load of the backhaul network.

Other Embodiments

The present disclosure has been described according to the embodiments described above. However, it should not be understood that the discussions and drawings constituting a part of this disclosure limit the present disclosure. From this disclosure, various alternative embodiments, examples and operational techniques will be apparent to those skilled in the art.

Particularly not mentioned in the embodiment, it is noted that the uplink signal before decoding transmitted from the non-anchor radio base station 310B to the anchor radio base station 310A includes a result (a bit sequence) obtained by sampling I/Q components constituting uplink signals received in the non-anchor radio base station 310B.

It is preferable that the uplink signal before decoding is transmitted from the non-anchor radio base station 310B to the anchor radio base station 310A in each subframe. It is preferable that the uplink signal before decoding includes a subframe number, and an identifier for identifying the UE 10, in addition to the result (the bit sequence) obtained by sampling the I/Q components. Alternatively, it is preferable that the uplink signal before decoding includes, besides these pieces of information, the type of a scheme (for example, a legacy scheme, a carrier aggregation scheme) in which the UE 10 transmits the uplink signal.

In addition, the entire content of U.S. Provisional Application No. 61/612,585 (filed on Mar. 19, 2012) is incorporated in the present specification by reference.

INDUSTRIAL APPLICABILITY

As described above, the mobile communication system and the mobile communication method according to the present disclosure is applicable in the field of the mobile communication field, as unnecessary transmission of uplink signals before decoding to the anchor radio base station from the non-anchor radio base station is suppressed, resulting in the suppression of an increase in the load of the backhaul network.

The invention claimed is:

1. A first radio base station, comprising:
a controller configured to perform reception of an uplink signal from a radio terminal simultaneously with a second base station, and
a transmitter, wherein
the controller is configured to determine whether received quality of the uplink signal satisfies predetermined quality during performing the reception simultaneously with the second base station,
the transmitter is configured to transmit the uplink signal satisfying the predetermined quality to the second radio base station through a backhaul network upon determining that the received quality of the uplink signal satisfies the predetermined quality, and
the transmitter is configured to restrict transmission of the uplink signal not satisfying the predetermined quality to the second radio base station through the backhaul network upon determining that the received quality of the uplink signal does not satisfy the predetermined quality.

2. A communication method, comprising:
performing by a first base station, reception of an uplink signal from a radio terminal simultaneously with a second base station,
determining, by the first base station, whether received quality of the uplink signal satisfies predetermined quality during performing the reception simultaneously with the second base station;
upon determining that the received quality of the uplink signal satisfies the predetermined quality, transmitting by the first base station, the uplink signal satisfying the predetermined quality to the second radio base station through a backhaul network; and
upon determining that the received quality of the uplink signal does not satisfy the predetermined quality, restricting by the first base station, transmission of the uplink signal not satisfying the predetermined quality to the second radio base station through the backhaul network.

3. An apparatus configured to control a first base station, comprising:
a processor and a memory coupled to the processor, the processor configured to execute processes of:
performing reception of an uplink signal from a radio terminal simultaneously with a second base station,
determining whether received quality of the uplink signal satisfies predetermined quality during performing the reception simultaneously with the second base station;
upon determining that the received quality of the uplink signal satisfies the predetermined quality, transmitting the uplink signal satisfying the predetermined quality to the second radio base station through a backhaul network; and
upon determining that the received quality of the uplink signal does not satisfy the predetermined quality, restricting transmission of the uplink signal not satisfying the predetermined quality to the second radio base station through the backhaul network.

* * * * *